United States Patent [19]

Symonds

[11] Patent Number: 4,800,713
[45] Date of Patent: Jan. 31, 1989

[54] ROTARY RAKES

[76] Inventor: Darrell C. Symonds, 13 Linkwater Street, Shelley, W.A. 6155, Australia

[21] Appl. No.: 7,762

[22] Filed: Jan. 28, 1987

[30] Foreign Application Priority Data

Jan. 28, 1986 [AU] Australia .............................. PH4353

[51] Int. Cl.$^4$ ............................................. A01D 78/14
[52] U.S. Cl. ..................................................... 56/377
[58] Field of Search ........................................ 56/377

[56] References Cited

U.S. PATENT DOCUMENTS

| | | | |
|---|---|---|---|
| 2,844,935 | 7/1958 | Cooley | 56/377 |
| 2,872,773 | 2/1959 | Van Der Lely et al. | 56/377 |
| 2,922,269 | 1/1960 | Van Der Lely et al. | 56/377 |
| 2,930,178 | 3/1960 | Van Der Lely et al. | 56/377 |
| 2,949,719 | 8/1960 | Van Der Lely et al. | 56/377 |
| 2,965,583 | 3/1961 | Van Der Lely et al. | 56/377 |
| 2,975,583 | 3/1961 | Van Der Lely et al. | 56/377 |
| 3,031,834 | 5/9162 | Van Der Lely et al. | 56/366 |
| 3,038,292 | 6/1962 | Van Der Lely et al. | 56/377 |
| 3,080,699 | 3/1963 | Van Der Lely | 56/377 |
| 3,135,082 | 6/1964 | Czajkowski | 56/377 |
| 3,151,431 | 10/1964 | Daugherty | 56/377 |
| 3,151,435 | 10/1964 | Johnston | 56/377 |
| 3,218,788 | 11/1965 | Hubbard | 56/377 |
| 3,279,160 | 10/1966 | Worrel | 56/377 |
| 3,320,735 | 5/1967 | Sutherland et al. | 56/377 |
| 3,376,697 | 4/1968 | Perold | 56/377 |
| 3,609,950 | 10/1971 | Remy | 56/377 |
| 4,231,218 | 11/1980 | Delgado | 56/370 |
| 4,324,093 | 4/1982 | Van Der Lely et al. | 56/379 |

Primary Examiner—Paul J. Hirsch
Attorney, Agent, or Firm—Cushman, Darby & Cushman

[57] ABSTRACT

A rotary rake in which each of the pin wheels (i.e. disk wheels) being arranged in echelon manner, has rearwardly inclined gaps between respective fingers whereby to promote removal of debris that otherwise will jam between the fingers.

4 Claims, 4 Drawing Sheets

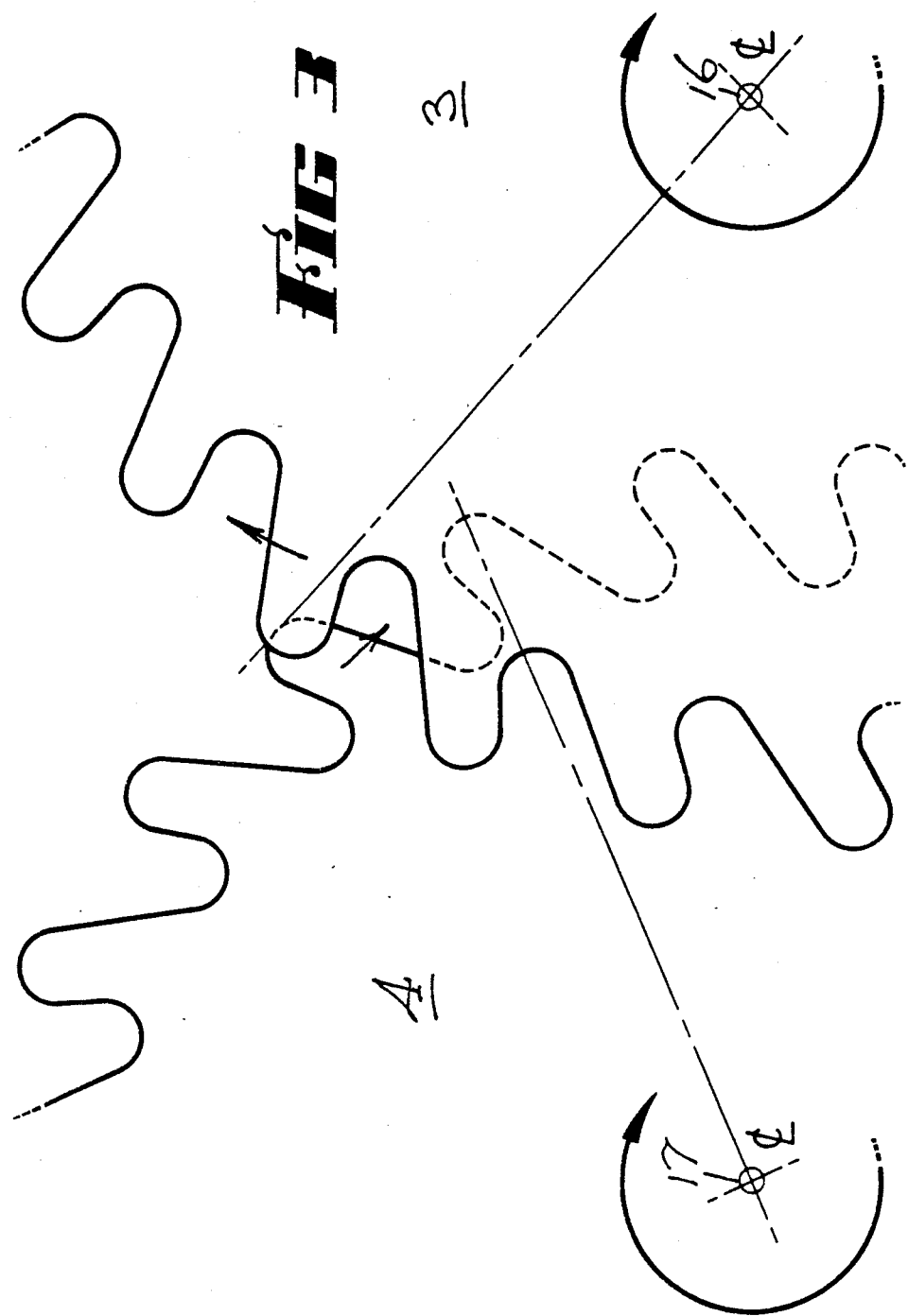

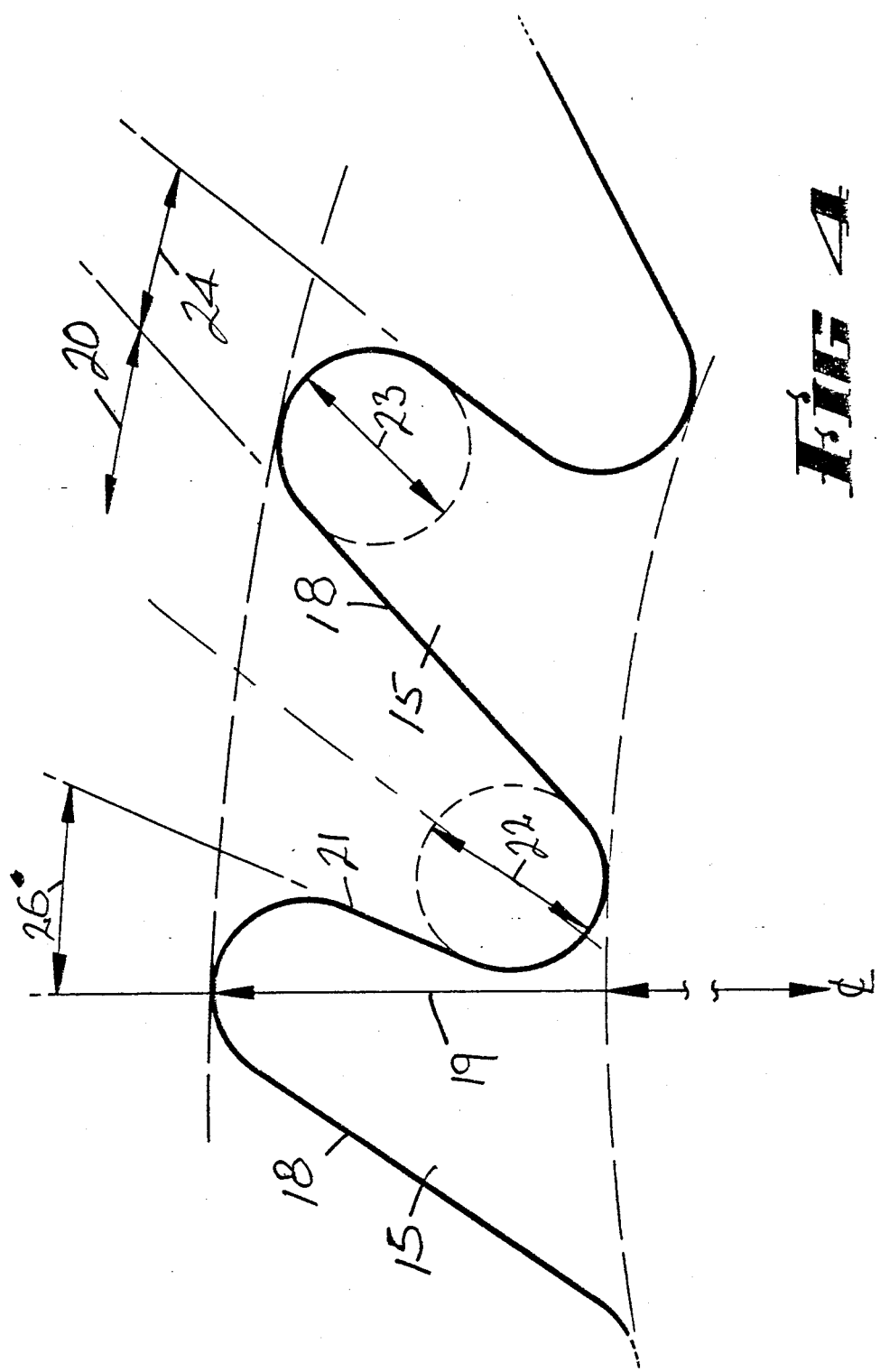

ative direction can provide some modification, but
ROTARY RAKES

BACKGROUND OF THE INVENTION

This invention relates to rotary rakes.

I have found that very large rotary rakes can be useful in the raking of large timbers.

Such a rake includes a plurality of pin wheels (i.e. rake wheels) of large diameter each conventionally of the same diameter and positioned in a parallel but overlapping relationship, each supported by an independently moveable crank arm, and the crank arms collectively held by a support frame which is drawn by an appropriate vehicle.

In such an arrangement, each pin wheel has a plurality of circumferentially spaced fingers extending radially outwards from a hub portion.

The advantage of using fingers is that these will allow timbers to be caught while allowing a significant proportion of soil to pass there through.

The problem to which this invention is directed is, however, the problem that, when the rake is being used for timber, there is a consistent probability that some of the timbers will be jammed between the fingers of any one pin wheel.

This can have the effect of their being raised and jammed against either a part of the frame or an adjacent pin wheel, thus stopping that particular pin wheel from rotating and the whole raking operation becoming significantly less effective until the blockage is cleared.

This has normally meant that the operator must stop pulling the rake, achieved access to the rake pin wheels, and then by whatever means are possible, hit or pull or lever the jamming log free from the fingers.

It will be readily realised the significant advantage of using such rotary rakes for the raking of large timbers is lost if there is a continuing need to effect such clearing, which can be both time consuming and, arduous to an operator.

SUMMARY OF THE INVENTION

According to this invention I have discovered that the aperture existing between each finger of a pin wheel (i.e. rake wheel) can be shaped so that, not only is there less likelihood for the logs to be jammed between the fingers, but moreover there can be a cooperative cleaning effect effected by adjacent pin wheels.

This is achieved by the shape and position of each gap between adjacent fingers of a single pin wheel and the shape and position of these features relative to the shape and position of adjacent fingers of adjacent wheels.

The actual shape and position of the sides defining the respective fingers can be quite widely varied while still achieving the general objects of this invention and will depend also to some extent upon the position of the immediately preceding pin wheel.

With each of the pin wheels engaging the ground, and with one pin wheel preceding the other and overlapping this by approximately half its diameter and generally facing in a direction 45 degrees to a forward moving direction, the effect is that the pin wheels will rotate at approximately the same speed and that the fingers of a following pin wheel will come closest to the leading pin wheel fingers at a location where the rear pin wheel fingers are starting to move downwardly while the front pin wheel fingers are still moving upwardly.

Taking into account the fact that both are moving in a relative direction can provide some modification, but generally the fingers and gaps between the fingers can have an effect of engaging timbers caught in the gaps between fingers in the following pin wheel at or about the closest location, with the result that one would expect any wooden pieces to be impaled and, provided that there is not an impossible resistance, shift the wood by pushing it out from the gap.

It is therefore the relative orientation of the site defining the gap that is the important factor in ensuring that this can be achieved.

If the leading edge of each finger is inclined to a radial direction of the wheels so that an outer part of the leading edge is further back from a leading position that an inner part of the leading edge, and such inclination is sufficient in the circumstances, then this achieves the object of the invention.

The extent of such inclination that is both preferred and at least sufficient will vary widely depending upon the relative position of the more forward pin wheel, the relative sizes of the respective pin wheels, and the nature of the surfaces comprises the leading edges.

The invention proposes a shaping and alignment of the leading edge of each finger such that it will cooperatively align with adjacent members, such as a pin wheel, so that a clearing effect of any jammed timbers or other rubbish may be effected upon rotation of the respective pin wheels in a common direction.

By preference, the shape and orientation of the edges of the fingers defining the gap between these is such, relative to the centre of the pin wheel, that a medial line through the gap will be substantially rearwardly inclined relative to the radius direction of the pin wheel.

By preference, the leading edge of each finger of the pin wheel is shaped so as to provide, at the least, a stright leading face and, in the alternative, a convex leading face where the alignment in the case of the straight edge and the tangent of any part of the convex edge is substantially rearwardly inclined relative to the radius of the pin wheel.

By preference, the rearward inclination of the leading edge of each of the fingers is within the range of 20 degrees to 50 degrees with respect to the direction of radius of the pin wheel.

By preference, the inclination lies within the range of 30 degrees to 40 degrees with respect to the inclination of the radius of the pin wheel.

By preference, the inclination is approximately 30 degrees 35 minutes with respect to the inclination of the radius.

By preference, the gap between respective adjacent fingers of each pin wheel has a tapered shape, with the wider part outermost and the angular relationship between the edges being within the range of 5 degrees to 10 degrees.

By preference, this is within the range of 6 degrees to 8 degrees and by preference, it is approximately 7 degrees.

BRIEF DESCRIPTION OF THE DRAWINGS

To assist in an understanding of the invention and to illustrate at least one way in which it has been carried out in practice, reference is now made to the preferred embodiment which is described with the assistance of drawings in which:

FIG. 3 illustrates the relative overlapping relationship between two of the pin wheels and the manner in which the fingers do relate one to the other, and finally FIG. 4 is an accurate depiction of the shape of the respective fingers and the gap between these relative to a radial direction.

DETAILED DESCRIPTION

Figure 1:
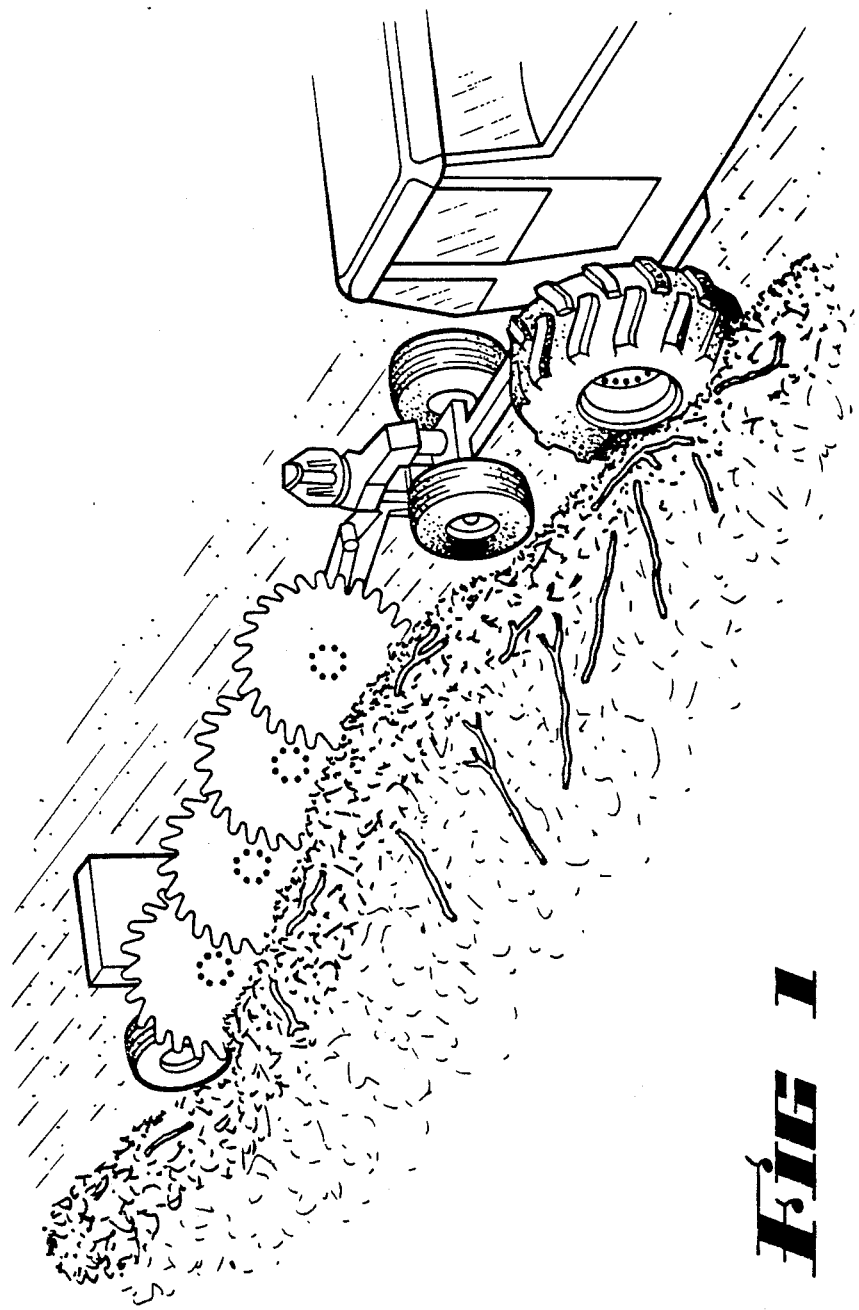
FIG. 1 illustrates a rotary rake with four pin wheels aligned in parallel relationship, attached and supported so as to be operative as required, the illustration also showing debris with timbers being caught and pushed forward by the pin wheels.
Figure 2:
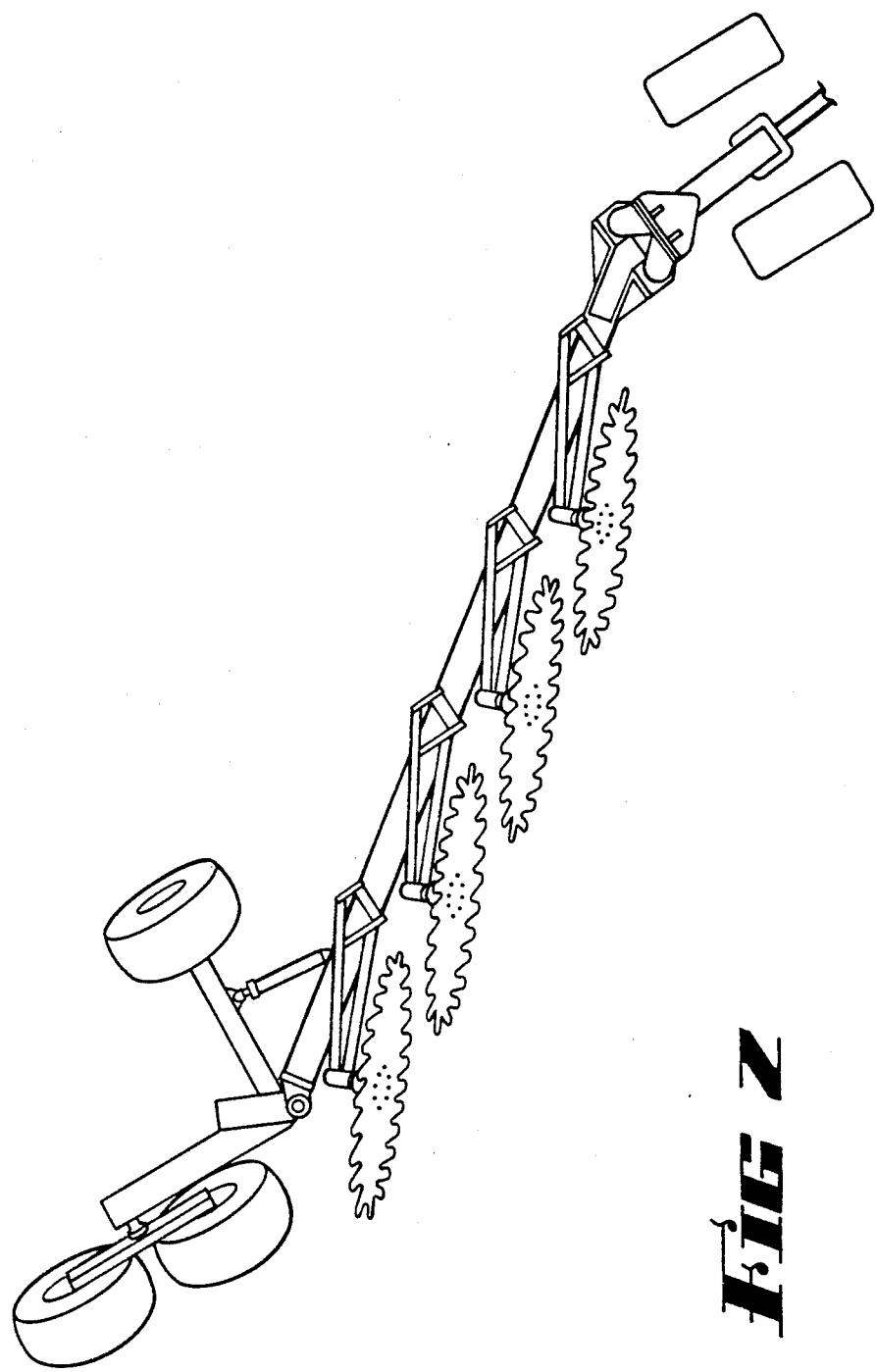
FIG. 2 is a plan view showing in some schematic detail the embodiment as shown in FIG. 1 especially showing how each of the pin wheels is independently supported for separate raising and lowering motion relative to a supporting frame.

Referring firstly to FIGS. 1 and 2 these show four pin wheels 1, 2, 3 and 4, each independently supported on a traction frame 5, such that each of the wheels 1, 2, 3 and 4 will be forwardly facing and positioned in front of the support and such that each will be aligned at approximately 45 degrees to a forward direction and such that a rotational axis will be slightly upwardly inclined all of these inclinations such that each of the wheels will generally rotate as they are being pulled along the ground by reason simply of ground contact.

Each of the wheels is supported by an individual support frame 7 in the case of wheel 1, 8 in the case of wheel 2, 9 in the case of wheel 3 and 10 in the case of wheel 4.

The individual support frames are in each case supported to be rotatable about a forward transverse horizontal axis as shown at 11.

There are controls such as hydraulic ram 12 whereby the rear bogy 13 can be aligned with respect to the frame 5 and the front steering wheels 14 whereby the orientation of the respective wheels 1, 2, 3 and 4 can be maintained relative to debris to be collected.

The feature of interest in respect of the present invention is that means by which the respective fingers generally referred to as 15 can be kept from snaring and locking-up pieces of timber which form part of debris as it is being gathered or pushed to one side.

In previous devices, such pieces of wood as would fit between the respective fingers would cause a jamming of the respective wheels which would require a stopping of the pulling tractor 16 and the manual breaking-up and then removal as best can be achieved with timbers that can be as much as 6 inches to a foot in diameter.

It has been found that by rearwardly inclining especially the leading edge of each of the fingers relative to the radial direction of the respective pin wheel and then ensuring that this is sufficient for the purpose considering the extent of overlap and the nature of the respective surfaces, a self-clearing effect can be maintained.

Such a discovery is of quite outstanding importance, ensuring that continuous clearing operation can be now achieved, whereas this has hitherto not been possible.

The extent to which the respective leading edge and the gap should have an altered shape depends upon a number of circumstances to such an extent that while in the specific instance illustrated, it has been discovered that the angular relationships work well, it is essential that such trials with a greater degree of inclination should be tested until the effect is achieved.

In FIG. 3, pin wheels 3 and 4 are shown in an overlapping relationship with centres at 16 and 17.

The degree of overlap selected in this figure illustrates only that which could be seen by looking square-on, that is from directly in front of the respective pin wheels.

This is selected simply because logs which might become ensnared will generally initially line-up in this direction with respect to individual fingers and gaps, but, of course, it is also to be remembered that each of the wheels is separated front-to-rear by a significant distance.

This allows, in practice, wood to incline and as the wheels return; even if they jam between the gaps, there is sufficient opening of the gap to cause a squeezing of these out from the gap between the respective fingers.

To illustrate the preferred arrangement, specific reference should be made to FIG. 4 in which fingers 15 each have a leading edge 18 which is aligned with respect to the radius direction 19 at an angle of 30 degrees 35 minutes as at 20.

The trailing edge 21 is aligned to the radius direction 19 with the angle 26 degrees 40 minutes and the diameters 22 and 23 are each 50 millimetres.

The diameter of the outside of the pin wheels in the preferred case is 2,292 millimetres and the diameter of the inner side of each of the gaps of the pin wheels is 1,892 millimetres.

As previously stated, the extent to which the leading edge of each finger should be rearwardly inclined can be varied. This must be found with respect to specific equipment so that while such rearward inclination can be found, as appropriate, within the range of 20 degrees to 50 degrees relative to the radial direction of each wheel. In our experience, this has been more specifically useful within the range 30 degrees to 40 degrees and, of course, it is indeed best in the application that we have found to be approximately 35 degrees or, indeed, exactly 33 degrees 35 minutes.

It is of value as well to ensure that the sides such as sides 18 and 21 defining the gap are inclined one to the other and outwardly taper and that these especially are shaped so that there is not provided a concave shape which will result in at least a part of the edge providing a shape which will effectively catch timber, that will provide a negative camber within the shape.

The present orientation of the respective sides is 7 degrees as shown at 24.

The invention can be further said to reside in the method of gathering timber including traversing through such timber areas with a rotary rake of the type discussed wherein each a pin wheel reacts with an adjacent pin wheel to provide a clearing effect for materials that may become jammed between the fingers of each pin wheel, the shape and alignment of each finger and associated gaps between the respective fingers being thus shaped to facilitate such removal.

I claim:

1. A rotary rake for raking of timbers and associated debris disposed on a ground plane, laterally to one side in relation to a longitudinally forward direction of travel of the rake along a towing path, for forming the timbers and associated debris into a longitudinal window extending along said side of said path, said rake comprising:

an elongated, generally horizontal main frame; said main frame being obliquely oriented as seen in top plan view so as to have a forward end, and a rearward end displaced laterally towards said side in relation to said longitudinally forward direction;

said main frame having a forward end, and ground-supported front bogey wheel means supporting said forward end;

said main frame further having a rear end, and ground-supporting rear bogey wheel means supporting said rear end;

tow bar means operatively connecting with said forward end of said main frame for towing said rotary rake in said longitudinally forward direction along said towing path;

a plurality of rake wheels, each including a generally planar hub portion having a plurality of circumferentially-shaped, radially outwardly-extending rake fingers integrally provided thereon and extending on an outer periphery thereof;

each rake wheel being disposed forwardly of a forward side of said main frame and supported thereon and journalled with respect thereto for rotation about its own longitudinal axis while facing about 45 degrees obliquely of said path, as seen in top plan view, and while being disposed so as to have a rotation axis which is slightly upwardly-forwardly inclined relative to horizontal;

each rake wheel being disposed to have respective ones of said rake fingers below the respective rake wheel hub portion disposed to intersect said ground plane, so that advancement of said rotary rake along said path causes ground engagement-induced rotation of said rake wheels in a common direction;

said rake wheels being arranged in a series in an echelon arrangement in which, as seen looking longitudinally backwards along said towing path, each further forward said rake wheel overlaps each respectively adjacent but further rearward said rake wheel nearly to axially centrally of the latter, and each said respectively adjacent but further rearward rake wheel extends further laterally to said one side of said towing path than the respectively adjacent further forward said rake wheel;

on each said rake wheel, said fingers being blunt-ended and each having a leading edge and a trailing edge relative to said common direction of rotation, adjacent ones of said fingers being spaced from one another by gaps, each gap having an imaginary medial line which bisects that gap into a leading half and a trailing half adjacent respective ones of said fingers;

on each said rake wheel, the leading edge of each finger being inclined, relative to respective longest radii of that rake wheel through respective teeth, so that a radially outer segment of each leading edge leads less than a radially inner segment thereof;

on each said rake wheel, said medial lines of said gaps being substantially rearwardly inclined relative to respective short radii of that rake wheel intersecting respective gap medial lines at a base of the respective gap, on said outer periphery of that rake wheel.

2. The rotary rake of claim 1, wherein:
the leading edge of each finger is inclined at an angle of 20–50 degrees relative to the respective said longest radii.

3. The rotary rake of claim 21, wherein:
each said finger is tapered and each said gap subtends an angle of 5–8 degrees.

4. The rotary rake of claim 1, wherein:
each said finger is tapered and each said gap subtends an angle of 5–10 degrees.

* * * * *